(12) United States Patent
Furukawa et al.

(10) Patent No.: US 8,445,113 B2
(45) Date of Patent: May 21, 2013

(54) ELECTRO-CONDUCTIVE MEMBER FOR ELECTROPHOTOGRAPHY, ELECTROPHOTOGRAPHIC APPARATUS, AND PROCESS CARTRIDGE

(75) Inventors: Takumi Furukawa, Susono (JP); Yusuke Yagisawa, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/557,097

(22) Filed: Jul. 24, 2012

(65) Prior Publication Data

US 2012/0288302 A1 Nov. 15, 2012

Related U.S. Application Data

(63) Continuation of application No. PCT/JP2012/001763, filed on Mar. 14, 2012.

(30) Foreign Application Priority Data

Apr. 5, 2011 (JP) ................................. 2011-084043

(51) Int. Cl.
 *B32B 27/00* (2006.01)
 *G03G 21/16* (2006.01)
 *G03G 15/02* (2006.01)

(52) U.S. Cl.
 USPC ............................ 428/500; 399/111; 399/176

(58) Field of Classification Search
 None
 See application file for complete search history.

(56) References Cited

U.S. PATENT DOCUMENTS

| 7,172,544 | B2 | 2/2007 | Ki et al. | |
|---|---|---|---|---|
| 7,693,457 | B2 | 4/2010 | Kuruma et al. | |
| 7,728,060 | B2 * | 6/2010 | Minagoshi et al. | 524/167 |
| 7,962,068 | B2 | 6/2011 | Kuroda et al. | |
| 2004/0136753 | A1 * | 7/2004 | Kato et al. | 399/176 |
| 2012/0141162 | A1 | 6/2012 | Mayuzumi et al. | |

FOREIGN PATENT DOCUMENTS

| JP | 9-309975 | A | 12/1997 |
|---|---|---|---|
| JP | 2002-212413 | A | 7/2002 |
| JP | 2004-170814 | A | 6/2004 |
| JP | 3540278 | B2 | 7/2004 |
| JP | 2007-2010 | A | 1/2007 |
| JP | 2007-163849 | A | 6/2007 |
| JP | 2007-256335 | A | 10/2007 |
| JP | 2009-75434 | A | 4/2009 |

\* cited by examiner

*Primary Examiner* — Sheeba Ahmed
(74) *Attorney, Agent, or Firm* — Fitzpatrick, Cella, Harper & Scinto

(57) ABSTRACT

When a polymer blend of an NBR and an alkylene oxide-polymerized polymer is used as the electro-conductive elastic layer of an electro-conductive member for electrophotography, a change in shape of the electro-conductive member occurs owing to its expansion due to water absorption, thereby causing image unevenness in some cases. In addition, when the ratio at which the alkylene oxide-polymerized polymer is blended is reduced for suppressing the shape change due to water absorption, image unevenness resulting from the insufficiency of electro-conductivity occurs in some cases. When an electro-conductive member for electrophotography having an electro-conductive elastic layer containing an NBR to which a specific alkylene oxide oligomer is graft-bonded is used, high ionic electro-conductivity is obtained and a change in its shape due to water absorption is reduced.

4 Claims, 2 Drawing Sheets

ELECTRO-CONDUCTIVE MEMBER FOR ELECTROPHOTOGRAPHY, ELECTROPHOTOGRAPHIC APPARATUS, AND PROCESS CARTRIDGE

CROSS-REFERENCE TO RELATED APPLICATIONS

This application is a continuation of International Application No. PCT/JP2012/001763, filed Mar. 14, 2012, which claims the benefit of Japanese Patent Application No. 2011-084043, filed Apr. 5, 2011.

BACKGROUND OF THE INVENTION

1. Field of the Invention

The present invention relates to an electro-conductive member to be used as a charging member or the like in an electrophotographic apparatus, an electrophotographic apparatus, and a process cartridge.

2. Description of the Related Art

A material formed of an ionic electro-conductive rubber composition has been known as a constituent material for the electro-conductive elastic layer of an electro-conductive member to be used in an electrophotographic apparatus. The elastic layer formed of such material has advantages in that the voltage dependence of its electrical resistance is small and a variation in its electro-conductivity is small. Japanese Patent No. 03540278 discloses an electro-conductive rubber roller using an ionic electro-conductive rubber composition containing, at a predetermined ratio, a terpolymer formed of ethylene oxide (EO)-propylene oxide (PO)-acrylic glycidyl ether (AGE), and an acrylonitrile-butadiene rubber (NBR).

However, an investigation on the electro-conductive rubber roller according to Japanese Patent No. 03540278 conducted by the inventors of the present invention has revealed that an elastic layer formed of the electro-conductive rubber composition containing the EO-PO-AGE terpolymer and the NBR has high moisture absorption property and the shape of the electro-conductive rubber roller changes owing to moisture absorption particularly under a high-humidity environment in some cases. Accordingly, when such electro-conductive roller is used as a charging roller, a variation in its charging performance resulting from the change of its shape may occur.

SUMMARY OF THE INVENTION

In view of the foregoing, the present invention is directed to providing the following electro-conductive member for electrophotography. A change in shape of the electro-conductive member due to moisture absorption is suppressed while the electro-conductive member maintains an advantage of ionic electro-conductivity. Further, the present invention is directed to providing an electrophotographic apparatus and a process cartridge capable of stably providing high-quality electrophotographic images under various environments.

According to one aspect of the present invention, there is provided an electro-conductive member for electrophotography, comprising: an electro-conductive substrate; and an electro-conductive elastic layer, wherein the electro-conductive elastic layer comprises a crosslinked product of an acrylonitrile-butadiene rubber having a unit represented by the following formula (1):

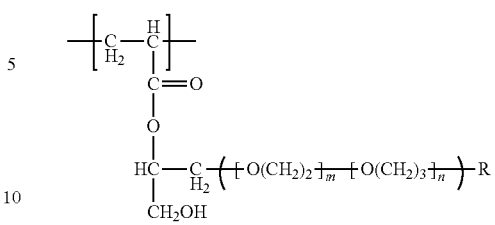

Formula (1)

in the formula (1), R represents a hydrogen atom or a hydrocarbon group having 1 to 20 carbon atoms, and m and n each independently represent an integer of 0 or 1 or more, provided that n+m is 10 or more and 100 or less.

According to another aspect of the present invention, there is provided a process cartridge, comprising the above-described electro-conductive member as a charging member, wherein the process cartridge is detachably mountable to a main body of an electrophotographic apparatus.

According to further aspect of the present invention, there is provided an electrophotographic apparatus, comprising the above-described electro-conductive member as a charging member.

According to the present invention, there is provided the following electro-conductive member for electrophotography. While the electro-conductive member has high electro-conductivity based on ionic electro-conductivity, a change in its shape due to moisture absorption is reduced and an environmental variation in its charging performance or the like is suppressed. In addition, according to the present invention, an electrophotographic apparatus and a process cartridge capable of forming high-quality electrophotographic images under various environments can be obtained.

Further features of the present invention will become apparent from the following description of exemplary embodiments with reference to the attached drawings.

DESCRIPTION OF THE EMBODIMENTS

Figure 1:
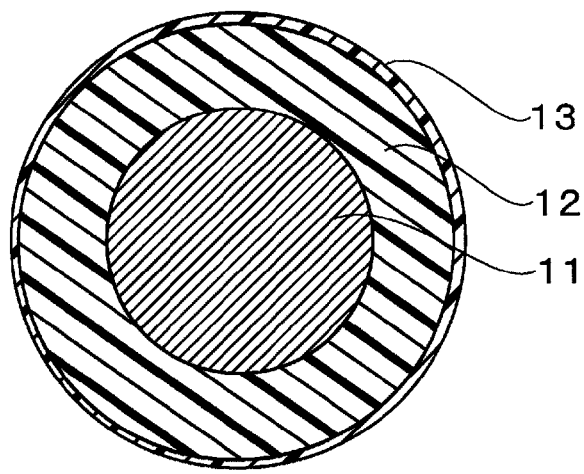
FIG. 1 is a sectional view illustrating an example of an electro-conductive member for electrophotography of the present invention.

Preferred embodiments of the present invention will now be described in detail in accordance with the accompanying drawings.

The inventors of the present invention have found that the moisture absorption property of a modified acrylonitrile-butadiene rubber (hereinafter, sometimes referred to as "modified NBR"), which is obtained by introducing a constitutional unit represented by the following formula (1) into an acrylonitrile-butadiene rubber having constitutional units represented by the following formula (2) and the following formula (3), and graft-bonding an alkylene oxide oligomer, is low. In addition, the inventors have found that a change in shape of an electro-conductive member for electrophotography including an elastic layer formed by using a rubber composition containing the modified NBR due to moisture absorption is suppressed.

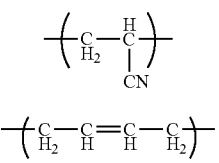

Formula (2)

Formula (3)

The inventors of the present invention assume the reason why the moisture absorption property of the modified NBR reduces to be as described below.

The water absorption property of an alkylene oxide (hereinafter, sometimes referred to as "AO")-polymerized polymer typified by an EO-PO-AGE-copolymerized polymer is extremely high. As the ether oxygen of ethylene oxide (EO) or propylene oxide (PO) is negatively polarized, the adjacent molecular chains of the EO-PO-AGE-copolymerized polymer repel each other, and water enters a gap between the molecular chains to alleviate the repellence. As a result, the EO-PO-AGE terpolymer has high moisture absorption property.

Although the moisture absorption property of an NBR alone is low, an AO molecular chain forms a domain phase having a size of several micrometers in a polymer blend of the EO-PO-AGE-copolymerized polymer and the NBR. In contrast, the NBR to which the AO oligomer represented by the formula (1) is graft-bonded exists in a semi-compatible state. In other words, an NBR molecular chain easily exists adjacently to an AO molecular chain and hence AO molecular chains are not adjacent to each other. Water absorption is reduced because the AO molecular chains do not repel each other. The inventors have considered that the shape change resulting from water absorption is suppressed as a result of the foregoing.

In addition, the EO-PO-AGE-copolymerized polymer discontinuously exists in the polymer blend of the EO-PO-AGE-copolymerized polymer and the NBR. In the NBR to which the AO oligomer represented by the formula (1) is graft-bonded, however, the AO oligomer continuously exists. Accordingly, the NBR to which the AO oligomer represented by the formula (1) is graft-bonded obtains high electro-conductivity at a small AO content.

The inventors of the present invention have made extensive studies on the basis of such assumption. As a result, the inventors have revealed that an electro-conductive member for electrophotography having an electro-conductive elastic layer containing an NBR to which an AO oligomer having a specific structure is graft-bonded shows high shape stability even in a high-humidity environment while having high electro-conductivity. The present invention has been made on the basis of such finding.

The construction of an electro-conductive member for electrophotography according to the present invention is described in detail below.

FIG. 1 is a schematic sectional view of the electro-conductive member for electrophotography according to the present invention. The electro-conductive member for electrophotography includes an electro-conductive elastic layer 12 formed on the outer peripheral surface of an electro-conductive substrate 11 and a surface layer 13 laminated on the outer periphery of the electro-conductive elastic layer 12.

<Electro-Conductive Substrate>

A metal such as iron, copper, stainless steel, aluminum, or nickel, or an alloy thereof can be given as an example of a material for the electro-conductive substrate.

<Electro-Conductive Elastic Layer>

The electro-conductive elastic layer contains a crosslinked product of an acrylonitrile-butadiene rubber having a unit represented by the following formula (1).

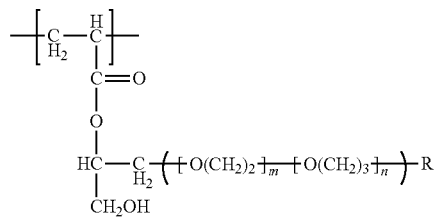

Formula (1)

(In the formula (1), R represents a hydrogen atom or a hydrocarbon group having 1 to 20 carbon atoms, and m and n each independently represent an integer of 0 or 1 or more, provided that n+m is 10 or more and 100 or less.)

In the structure represented by the formula (1), AO molecular chains do not gather because of the following reasons. An AO molecular chain is grafted and hence the movement of the AO molecular chain over time is suppressed. The AO molecular chain has a moderate length. A hydrocarbon group exists at the terminal of a side chain of the AO molecular chain. Accordingly, it is conceivable that the expansion of the electro-conductive member due to water absorption can be suppressed and high electro-conductivity is obtained even when an AO content is small.

m+n is the sum of m representing the number of ED units and n representing the number of PO units, i.e., the total number of AO units. In addition, p+q is the sum of q representing the number of EO units and p representing the number of PO units, i.e., the total number of AO units. When the number m+n (or p+q) of AO units is 10 or more, an ion-transporting effect is high and hence electro-conductivity is expressed. When the number m+n (or p+q) of AO units is 100 or less, an increase in resistance of the electro-conductive member due to the crystallization of an AO in an AO molecular chain or an increase in amount of absorbed water due to the gathering of AO molecular chains is suppressed.

Additionally high electro-conductivity is obtained when no AO crystallizes. Accordingly, EO and PO are preferably copolymerized, in other words, m and n each preferably represent 1 or more. p and q each also preferably represent 1 or more. In addition, EO and PO are more preferably a random copolymerization oligomer.

R represents hydrogen or a hydrocarbon group having 1 or more and 20 or less carbon atoms. As the hydrocarbon group represented by R has a larger molecular weight and a bulkier steric structure, the extent to which the crystallization of an AO molecular chain is prevented can be enlarged. Accordingly, R preferably represents a hydrocarbon group having 4 or more carbon atoms. In addition, the molecular structure of the hydrocarbon group prefers a cyclic structure to a chain structure and prefers a multicyclic ring structure to a monocyclic structure.

The acrylonitrile-butadiene rubber (NBR) having a unit represented by the formula (1) is, for example, a compound obtained by graft-bonding a carboxylated NBR (hereinafter referred to as "XNBR") and a one-terminal-epoxidized, AO-polymerized oligomer represented by the following formula (4).

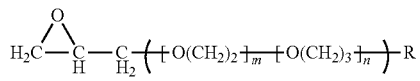

Formula (4)

(In the formula (4), R represents a hydrogen atom or a hydrocarbon group having 1 to 20 carbon atoms, m and n each independently represent an integer of 0 or 1 or more, provided that n+m is 10 or more and 100 or less.)

A reaction between the carboxyl group of the XNBR and the epoxy group of the one-terminal-epoxidized, AO-polymerized oligomer represented by the formula (4) yields the NBR having a unit represented by the formula (1) in which the one-terminal-epoxidized, AO-polymerized oligomer is graft-bonded to a side chain of the XNBR.

Although the XNBR is not particularly limited, a product having a carboxyl group content of 1 to 10%, an acrylonitrile amount of 25 to 35%, and a Mooney viscosity of 30 ML1+4 (100° C.) or more and 70 ML1+4 (100° C.) or less can be used.

The term "one-terminal-epoxidized, AO-polymerized oligomer" as used in the present invention refers to oligomers including an EO-homopolymerized oligomer, a PO-homopolymerized oligomer, and an EO-PO-copolymerized oligomer. The EO-PO-copolymerized oligomer may be random copolymerization oligomer, or may be a block copolymerization oligomer. Of those, the EO-PO random copolymerization oligomer is preferred because an AO hardly crystallizes.

A method of synthesizing the one-terminal-epoxidized, AO-polymerized oligomer according to the following schemes (1) to (3) can be given as an example of the synthesis of the oligomer.

(1) A polyether monoalcohol is synthesized by subjecting monoalcohols or monophenols having various hydrocarbon groups, and ethylene oxide and propylene oxide to an addition reaction in the presence of a catalyst such as an alkali metal hydroxide.

(2) The polyether monoalcohol and epichlorohydrin are subjected to an addition reaction in the presence of a Lewis acid, catalyst such as a boron trifluoride-ether complex salt.

(3) The one-terminal-epoxidized, AO-polymerized oligomer is obtained by adding an aqueous solution of sodium hydroxide to the product of the addition reaction to cyclize the product.

A reaction for graft-bonding the one-terminal-epoxidized, AO-polymerized oligomer to the XNBR is accelerated through heating in the presence of the XNBR and the one-terminal-epoxidized, AO-polymerized oligomer. At this time, a tertiary amine, a quaternary ammonium salt, or an imidazole compound may be used as a catalyst.

The graft reaction, which may be performed before the molding of the electro-conductive elastic layer, is preferably performed simultaneously with the step of obtaining the crosslinked product of the NBR because production steps are shortened. When the crosslinking of the NBR is performed with heat, the graft reaction and the crosslinking of the NBR can be performed simultaneously, and hence energy required for the production can be reduced. In addition, a production method involving simultaneously performing the graft reaction and the crosslinking of the NBR has such an advantage in terms of processing that the viscosity of the rubber compound is low because the one-terminal-epoxidized, AO-polymerized oligomer has a plasticizing action before the graft reaction.

In addition, a general compounding agent can be used in the electro-conductive elastic layer to such an extent that characteristics needed for the electro-conductive member for electrophotography of the present invention such as electro-conductivity and water absorption resistance are not lost. An electro-conductive agent, a crosslinking agent, a crosslinking accelerator, crosslinking supplement accelerator, a processing aid, a crosslinking retarder, a filler, a dispersant, a foaming agent, a lubricant, an age resister, an antiozonant, an antioxidant, a plasticizer, a softening agent, and a modifier can be given as examples of the compounding agent.

In addition, any other raw material rubber may be blended to such an extent that the electro-conductivity and the water absorption resistance needed in the present invention are not lost.

A method involving using a closed kneader such as a Banbury mixer, an intermix, or a pressure kneader, or a method involving using an open kneader such as an open roll can be given as an example of a method of kneading the XNBR, the one-terminal-epoxidized, AO-polymerized oligomer, and the compounding agent.

A method of forming, on the electro-conductive substrate, the rubber compound for the electro-conductive elastic layer obtained by the kneading is, for example, a known molding method such as extrusion molding, injection molding, or compression molding. In particular, crosshead extrusion molding involving extruding an unvulcanized rubber compound integrally with the electro-conductive substrate is preferred in consideration of, for example, an improvement in working efficiency.

The step of heating the rubber compound for the electro-conductive elastic layer to obtain the crosslinked product is, for example, a curing molding method based on heat such as die molding, vulcanizer molding, continuous furnace molding, far/near-infrared molding, or induction heating molding.

The electro-conductive elastic layer after the crosslinking may be ground for the smoothening of its surface and the fine finish of its shape. A traverse mode or a wide grinding mode is available as a grinding method. The traverse mode involves moving a short grindstone in conformity with the electro-conductive elastic layer to grind the electro-conductive elastic layer. In contrast, the wide grinding mode is such a mode that the grinding can be performed within a very short time with a wide grindstone, that is, a grindstone whose width is wider than the length of the electro-conductive elastic layer. Of those, the wide grinding mode is preferred in consideration of, for example, an improvement in working efficiency.

That the one-terminal-epoxidized, AO-polymerized oligomer is bonded to the XNBR can be confirmed with the ratio at which the one-terminal-epoxidized, AO-polymerized oligomer is extracted by Soxhlet extraction. In addition, the state of the progress of the reaction can be understood through measurement by a combination of infrared spectroscopy (IR), near-infrared spectroscopy (NIR), and Raman spectroscopy. For example, reductions in intensities of a peak assigned to O—H of a carboxyl group near 3000 cm$^{-1}$, near 1410 cm$^{-1}$, or near 920 cm$^{-1}$ in IR and a peak assigned to an epoxy group near 1250 cm$^{-1}$ in Raman spectroscopy are detected. In addition, an increase in intensity of a peak assigned to a hydroxyl group near 3300 cm$^{-1}$ in IR is detected. That a hydroxyl group is produced by the bonding of a carboxyl group and an epoxy group can be understood from those detected results.

In addition, the copolymerization ratio of the XNBR and the structure of the one-terminal-epoxidized, AO-polymerized oligomer can be identified by solid high-resolution $^{13}$C-NMR.

Further, the structure of the one-terminal-epoxidized, AO-polymerized oligomer can be identified by analyzing an extracted unreacted product by microsampling mass spectrometry (μ-MS).

(Surface Layer)

In the present invention, a surface layer may be formed for imparting, for example, anti-contamination property for preventing toner or an external additive from adhering to the electro-conductive member for electrophotography and leak resistance for preventing an overcurrent from flowing.

(Electrophotographic Apparatus)

Figure 2:
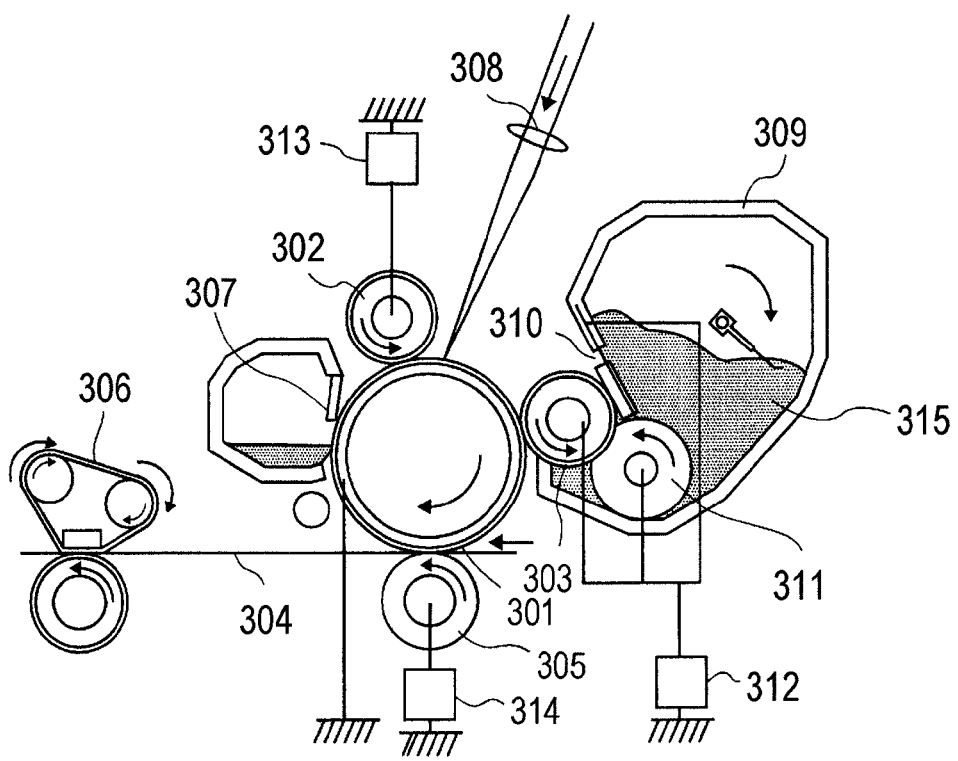
FIG. 2 is an explanatory diagram of an electrophotographic apparatus according to the present invention.

FIG. 2 is a schematic view of an electrophotographic apparatus using the electro-conductive member according to the present invention as a charging roller. The electrophotographic apparatus is constructed of members such as: a charging roller 302 for charging an electrophotographic photosensitive member 301; a latent image-forming apparatus 308 for performing exposure; a developing apparatus 303 for developing a latent image into a toner image; a transferring apparatus 305 for transferring the toner image onto a transfer material 304; a cleaning apparatus 307 for recovering transfer residual toner on the electrophotographic photosensitive member; and a fixing apparatus 306 for fixing the toner image. The electrophotographic photosensitive member 301 is of a rotating drum type having a photosensitive layer on an electro-conductive substrate.

The electrophotographic photosensitive member 301 is rotationally driven in the direction indicated by an arrow at a predetermined peripheral speed (process speed). The charging roller 302 is placed to contact the electrophotographic photosensitive member 301 by being pressed against the electrophotographic photosensitive member with a predetermined force. The charging roller 302 rotates in accordance with the rotation of the electrophotographic photosensitive member 301, and charges the electrophotographic photosensitive member 301 to a predetermined potential through the application of a predetermined DC voltage from a power source 313 for charging. The electrophotographic photosensitive member 301 that has been uniformly charged is irradiated with light 308 corresponding to image information. Thus, an electrostatic latent image is formed.

A developer 315 in a developer container 309 is supplied to the surface of the developing roller 303 placed so as to contact the electrophotographic photosensitive member 301 by a developer-supplying roller 311. After that, a layer of the developer charged so as to be of the same polarity as that of the charged potential of the electrophotographic photosensitive member is formed on the surface of the developing roller 303 by a developer amount-regulating member 310. The electrostatic latent image formed on the electrophotographic photosensitive member is developed with the developer by reversal development. The transferring apparatus 305 has a contact-type transfer roller. The transferring apparatus transfers the toner image from the electrophotographic photosensitive member 301 to the transfer material 304 such as plain paper. It should be noted that the transfer material 304 is conveyed by a sheet-feeding system having a conveying member. The cleaning apparatus 307 has a blade-type cleaning member and a recovery container, and mechanically scrapes off and recovers the transfer residual toner remaining on the electrophotographic photosensitive member 301 after the transfer. Here, the cleaning apparatus 307 can be removed by adopting such a simultaneous-with-development cleaning mode that the transfer residual toner is recovered in the developing apparatus 303. The fixing apparatus 306 is constructed of a member such as a heated roll. The fixing apparatus fixes the transferred toner image on the transfer material 304 and then discharges the resultant to the outside of the apparatus. Reference numerals 312 and 314 each represent a DC power source.

(Process Cartridge)

Figure 3:
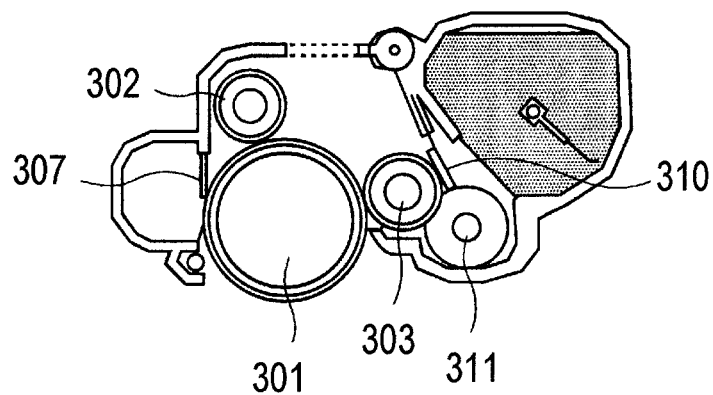
FIG. 3 is an explanatory diagram of a process cartridge according to the present invention.

In addition, FIG. 3 is a schematic sectional view of a process cartridge obtained by applying an electro-conductive member according to the present invention to the charging roller 302. As illustrated in FIG. 3, the process cartridge according to the present invention includes the electrophotographic photosensitive member 301, the charging roller 302, the developing apparatus 303, the cleaning apparatus 307, and the like are integrated, and is detachably mountable to the main body of the electrophotographic apparatus.

Hereinafter, the present invention is more specifically described by way of specific examples.

Production Example A

Method of Synthesizing One-Terminal-Epoxidized, Alkylene Oxide (AO)-Polymerized Oligomer Synthesis Example A-1

Synthesis of One-Terminal-Epoxidized, EO-Polymerized Oligomers 1 to 5

Materials shown in Table 1 were loaded into a reaction vessel and then the air in the vessel was replaced with nitrogen. While the mixture was heated to 150° C., 10 mol of ethylene oxide (molecular weight=44) were gradually added to the mixture to perform an addition reaction. Subsequently, the resultant was cooled to 80° C. and then phosphoric acid was added to neutralize the resultant. Next, the neutralized product was heated under reduced pressure to be dehydrated, followed by filtration. Thus, a polyethylene oxide adduct of lauryl alcohol was obtained.

TABLE 1

| | |
|---|---|
| Lauryl alcohol | 1 mol |
| Aqueous solution of sodium hydroxide | Corresponding to 0.05 mol of sodium hydroxide |

Next, materials shown in Table 2 below were heated while being refluxed.

TABLE 2

| Material | Compounding amount |
|---|---|
| Polyethylene oxide adduct of lauryl alcohol obtained in the foregoing | 1 mol |
| Epichlorohydrin (molecular weight = 92.5) | 1 mol |
| Boron trifluoride-ethyl ether complex salt (molecular weight = 141.9) | 0.02 mol |

An aqueous solution of sodium hydroxide (corresponding to 1.5 mol of sodium hydroxide) was dropped to the reaction product to cyclize the product through dehalogenation. Further, water was added to the resultant to dissolve sodium chloride in the water layer, and then the separated organic layer was distilled under reduced pressure. Thus, a one-terminal-epoxidized, EO-polymerized oligomer 2 whose number of EO units was 10 was obtained.

A one-terminal-epoxidized, EO-polymerized oligomer 3 whose number of EO units was 100, a one-terminal-epoxidized, EO-polymerized oligomer 4 whose number of EO units was 5, and a one-terminal-epoxidized, EO-polymerized oligomer 5 whose number of EO units was 200 were produced by changing the amount of ethylene oxide of the production example.

Synthesis Example A-2

Synthesis of One-Terminal-Epoxidized, PO-Polymerized Oligomer 1

A one-terminal-epoxidized, PO-polymerized oligomer 1 whose number of PO units was 15 was produced in the same manner as in Synthesis Example A-1 except that 10 mol of ethylene oxide were changed to 15 mol of propylene oxide (molecular weight=58) in Synthesis Example A-1.

Synthesis Example A-3

Synthesis of One-Terminal-Epoxidized, EO-PO-Copolymerized Oligomer 1

A one-terminal-epoxidized, EO-PO-copolymerized oligomer 1 whose number of EO units was 10 and whose number of PO units was 10 was produced in the same manner as in Synthesis Example A-1 except that 10 mol of propylene oxide were used as an alkylene oxide together with 10 mol of ethylene oxide (molecular weight=44) in Synthesis Example A-1.

Example 1

Production of Electro-Conductive Elastic Layer

A production procedure for an electro-conductive elastic layer roller having an electro-conductive elastic layer on a cylindrical electro-conductive substrate is described below.

Raw materials (A) shown in Table 3 were kneaded with a pressure kneader for 15 minutes. Thus, a mixture of the raw materials (A) was obtained.

TABLE 3

| Raw materials (A) | |
|---|---|
| XNBR (trade name: "Nipol 1072J", manufactured by ZEON CORPORATION, acrylonitrile unit amount: 27%, carboxylic acid unit amount: 7%, Mooney viscosity: 48 ML1 + 4 (100° C.)) | 100 parts by mass |
| One-terminal-epoxidized, EO-polymerized oligomer 1 (trade name: "DENACOL EX-171", manufactured by Nagase ChemteX Corporation, lauryl alcohol $EO_{15}$ glycidyl ether having 15 EO repeating units) | 50 parts by mass |
| Zinc oxide (trade name: "Zinc White Type 2", manufactured by HakusuiTech Co., Ltd.) | 5 parts by mass |
| Calcium carbonate (trade name: "NANOX #30", manufactured by Maruo Calcium Co., Ltd.) | 120 parts by mass |
| Stearic acid (trade name: "Stearic acid S", manufactured by Kao Corporation) | 1 part by mass |
| Quaternary ammonium salt (trade name: "LV-70", manufactured by Asahi Denka Kogyo K.K.) | 2 parts by mass |

Further, the mixture of the raw materials (A) and raw materials (B) shown in Table 4 were kneaded with an open roll whose temperature had been regulated to 20° C. for 10 minutes. Thus, a rubber compound 1 for forming an electro-conductive elastic layer was obtained.

TABLE 4

| Raw materials (B) | |
|---|---|
| Tetramethylthiuram monosulfide (trade name: "NOCCELER TS", manufactured by Ouchi Shinko Chemical Industrial Co., Ltd.) | 1 part by mass |
| Dibenzothiazolyl disulfide (trade name: "NOCCELER DM-P", manufactured by Ouchi Shinko Chemical Industrial Co., Ltd.) | 1 part by mass |
| Sulfur (trade name: "Sulfax PMC", manufactured by Tsurumi Chemical Industry Co., Ltd.) | 0.8 part by mass |

The rubber compound 1 for forming an electro-conductive elastic layer was extruded by a crosshead extruder together with the cylindrical electro-conductive substrate, and was then molded into a roller shape having an outer diameter of about 9 mm.

Next, the resultant was heated in an electric oven at 160° C. for 1 hour. Thus, the XNBR and the one-terminal-epoxidized, AO-polymerized oligomer were graft-bonded to each other. In addition, the XNBR was vulcanized with sulfur. Both end portions of the rubber were cut out. Thus, the electro-conductive substrate was exposed and the length of the electro-conductive elastic layer was set to 228 mm. After that, the surface of the resultant was ground so that the resultant was turned into a roller shape having an outer diameter of 8.5 mm. Thus, an elastic roller 1 was obtained.

(Preparation of Paint for Surface Layer)

A preparation procedure for a paint for forming a surface layer is described below.

Materials shown in Table 5 were mixed. Thus, a mixed solution was obtained.

TABLE 5

| Caprolactone-modified acrylic polyol solution (trade name: "PLACCEL DC2016", manufactured by Daicel Chemical Industries, Ltd., solid content: 70 mass %) | 100 parts by mass |
|---|---|
| Block isocyanate IPDI (trade name: "VESTANAT B1370", manufactured by Degussa-Huels AG) | 22.5 parts by mass |
| Block isocyanate HDI (trade name: "DURANATE TPA-B80E", manufactured by Asahi Kasei Corporation) | 33.6 parts by mass |
| Carbon black (trade name: "MA77", manufactured by Mitsubishi Chemical Corporation) | 20 parts by mass |
| Modified dimethyl silicone oil (trade name: "SH28PA", manufactured by Dow Corning Toray Silicone Co., Ltd.) | 0.16 part by mass |
| Spherical acrylic resin particles (trade name: "MX1000", manufactured by Soken Chemical & Engineering Co., Ltd.) | 6 parts by mass |
| Methyl isobutyl ketone (MIBK) | 328 parts by mass |

The mixed solution was charged into a glass bottle containing glass beads having an average particle diameter of 0.8 mm as dispersion media, and was then dispersed with a paint shaker dispersing machine for 60 hours. After that, the glass beads were filtered. Thus, a paint 1 for forming a surface layer was obtained.

(Production of Surface Layer)

The elastic roller 1 was immersed in the paint 1 for forming a surface layer. Thus, the coating film of the paint 1 for forming a surface layer was formed on the surface of the elastic layer. After that, the resultant was heated in an electric oven at 80° C. for 1 hour and then at 160° C. for 1 hour. Thus, the coating film of the paint 1 for forming a surface layer was crosslinked. As a result, a surface layer was formed. Thus, an electro-conductive member 1 for electrophotography according to this example was obtained.

(Analysis of that XNBR and one-terminal-epoxidized, AO-polymerized oligomer are bonded to each other)

The electro-conductive elastic layer of the electro-conductive member 1 for electrophotography was analyzed by solid high-resolution $^{13}$C-NMR. As a result, it was confirmed that the XNBR and the one-terminal-epoxidized, EO-polymerized oligomer were bonded to each other in the electro-conductive elastic layer.

(Evaluation 1: Volume Resistivity)

In the evaluation of the electro-conductive elastic layer for its electro-conductivity, a current value was measured by the following method and then its volume resistivity was calculated. A measurement sample used here was obtained by curing the compound for an electro-conductive elastic layer of Example 1 at 160° C. for 1 hour and molding the cured product into a sheet shape having a thickness of 2 mm. The measurement of the volume electro-conductivity was performed on the basis of the double ring electrode method of JIS K6271:2001. A voltage of −200 V was applied between electrodes each having a diameter of 10 mm in an environment having a temperature of 23° C. and a relative humidity of 50% RH, and then current values at five sites of each sample were measured. The average of the measured values was calculated and defined as the volume resistivity (Q·cm).

(Evaluation 2: Measurement of Outer Diameter Expansion Coefficient)

An outer diameter expansion coefficient was measured according to the following procedure. First, the outer diameter of the electro-conductive member for electrophotography of Example 1 that had been left to stand in a 23° C., 50% RH environment for 2 days or more was measured. Next, its outer diameter immediately after (within 5 minutes) the electro-conductive member had been left to stand in a constant temperature and humidity chamber with a 40° C., 95% RH environment for 1 week was measured. The outer diameter expansion coefficient (=Outer diameter after standing/outer diameter before standing*100%−100%) was calculated from the outer diameters before and after the standing in the constant temperature and humidity chamber.

(Evaluation 3: Measurement of Microrubber Hardness)

A microhardness was measured as one indicator of that the XNBR and the one-terminal-epoxidized, AO-polymerized oligomer were bonded to each other. A measurement sample used here was obtained by curing the compound for an electro-conductive elastic layer of Example 1 at 160° C. for 1 hour and molding the cured product into a sheet shape having a thickness of 2 mm. A microregion rubber hardness meter (trade name: "ASKER Microrubber Hardness Meter Model MD-1", manufactured by KOBUNSHI KEIKI CO., LTD.) was used as a measuring device. It should be noted that in the present invention, the value of the measurement sample, which had been left to stand in a 23° C., 55% RH environment for 12 hours or more, measured according to a 10-N peak hold mode was evaluated.

(Evaluation 4: High-Temperature, High-Humidity Standing Evaluation (Horizontal Belt-Like Image Unevenness at Abutting Portion))

The electro-conductive member for electrophotography of Example 1 was mounted as a charging roller on the black cartridge of an electrophotographic apparatus (trade name: "LBP5400", manufactured by Canon Inc.). The cartridge was left to stand in a constant temperature and humidity chamber with a 40° C., 95% RH environment for 1 month. During the period, the charging roller was always in a state of abutting a photosensitive member and its abutting position was not changed. The cartridge was taken out of the constant temperature and humidity chamber and then its abutting portion was evaluated for horizontal belt-like image unevenness.

At this time, a commercial product reconstructed so as to output a recording medium at a speed of 200 mm/sec was used as the electrophotographic apparatus. An image was output in a 23° C., 50% RH environment. A halftone image was output as an evaluation image. It should be noted that the term "halftone image" as used herein refers to such an image having an intermediate density that horizontal lines each having a width of 1 dot are drawn at an interval of 2 dots in a direction perpendicular to the rotation direction of the electrophotographic photosensitive member. The image was evaluated by criteria shown in Table 6 below for whether or not horizontal belt-like image unevenness occurred at a position corresponding to the abutting portion of the charging roller and the photosensitive member.

TABLE 6

| Rank | Criterion |
|---|---|
| A | No abutting mark is observed. |
| B | A slight, horizontal belt-like abutting mark is observed but causes no problems in practical use. The abutting mark disappears when the cartridge is left at rest in a 23° C., 50% RH environment for 3 hours and then image output is performed again. |
| C | A horizontal belt-like abutting mark exists. The abutting mark disappears when the cartridge is left at rest in a 23° C., 50% RH environment for 3 days and then image output is performed again. |
| D | A horizontal belt-like abutting mark exists. The abutting mark does not disappear even when the cartridge is left at rest in a 23° C., 50% RH environment for 3 days and then image output is performed again. |

Example 1 was ranked as A because of the following reason. The outer diameter expansion coefficient was suppressed to 2.5%, and a difference in outer diameter expansion between the abutting portion and a non-abutting portion resulting from water absorption was small, and hence no horizontal belt-like abutting mark was observed.

(Evaluation 5: Horizontal Streak-Like Image Unevenness)

The produced electro-conductive member for electrophotography of Example 1 was mounted as a charging roller on the black cartridge of an electrophotographic apparatus (trade name: "LBP5400", manufactured by Canon Inc.). The process cartridge was mounted on the electrophotographic apparatus and then 30,000 electrophotographic images were output. It should be noted that the electrophotographic apparatus was reconstructed so as to output paper at a speed of 200 mm/sec. In addition, the electrophotographic images were output in an environment having a temperature of 15° C. and a relative humidity of 10% RH. In addition, the electrophotographic images were such that the characters of an alphabet "E" each having a size of 4 points were printed at random on 1 area % of the image-forming region of A4-sized paper. It should be noted that the output of the electrophotographic images was performed by repeating the following operation. Every time one image was output, the electrophotographic apparatus was stopped, and after a lapse of 10 seconds, an image-forming operation was restarted. Then, after the output of the 30,000 electrophotographic images, one halftone image was output, and then the halftone image was visually observed and evaluated by criteria shown in Table 7 below.

TABLE 7

| Rank | Criterion |
|------|-----------|
| A | No horizontal streak-like image unevenness exists. |
| B | Nearly no horizontal streak-like image unevenness exists and no problems arise in practical use. |
| C | Horizontal streak-like image unevenness exists slightly and/or in part of the image. |
| D | Horizontal streak-like image unevenness exists in the entire image. |

(Example 2) to (Example 7)

Table 9-1 shows the kinds and addition amounts of one-terminal-epoxidized, AO-polymerized oligomers used in compounds 2 to 7 for forming electro-conductive elastic layers of Examples 2 to 7. Here, the same materials as those of the compound 1 for forming an electro-conductive elastic layer according to Example 1 except the items shown in Table 9-1 were used. In addition, electro-conductive members 2 to 7 for electrophotography according to Examples 2 to 7 were each produced by the same method as that of the electro-conductive member 1 for electrophotography except that any one of the compounds 2 to 7 for forming electro-conductive elastic layers was used, and were then subjected to Evaluations 1 to 5.

The electro-conductive elastic layers of the electro-conductive members 2 to 7 for electrophotography according to Examples 2 to 7 were analyzed by solid high-resolution $^{13}$C-NMR. As a result, it was confirmed that the XNBR and the one-terminal-epoxidized, AO-polymerized oligomer were bonded to each other in each electro-conductive elastic layer.

(Comparative Example 1) and (Comparative Example 2)

Table 1Q-1 shows the kinds and addition amounts of one-terminal-epoxidized, AO-polymerized oligomers used in compounds C-1 and C-2 for forming electro-conductive elastic layers of Comparative Examples 1 and 2. Here, the same materials as those of the compound 1 for forming an electro-conductive elastic layer according to Example 1 except the items shown in Table 10-1 were used. In addition, electro-conductive members C-1 and C-2 for electrophotography according to Comparative Examples 1 and 2 were each produced by the same method as that of the electro-conductive member 1 for electrophotography except that one of the compounds C-1 and C-2 for forming electro-conductive elastic layers was used, and were then subjected to Evaluations 1 to 5.

The electro-conductive elastic layers of the electro-conductive members C-1 and C-2 for electrophotography according to Examples 2 to 7 were analyzed by solid high-resolution $^{13}$C-NMR. As a result, it was confirmed that the XNBR and the one-terminal-epoxidized, AO-polymerized oligomer were bonded to each other in each electro-conductive elastic layer.

In Comparative Example 1, as the number of EO units was 5, the resistance was high. The rank concerning horizontal belt-like image unevenness resulting from a difference in outer diameter expansion was A and the rank concerning horizontal streak-like image unevenness resulting from a high resistance was C. Further, in Comparative Example 2, as the number of EO units was 200, the resistance was high and the outer diameter expansion was not suppressed. Both the ranks concerning horizontal belt-like image unevenness resulting from a difference in outer diameter expansion and horizontal streak-like image unevenness resulting from a high resistance were C.

Comparative Example 3

A compound C-3 for forming an electro-conductive elastic layer was prepared in the same manner as in the compound 1 for forming an electro-conductive elastic layer except that the one-terminal-epoxidized, EO-polymerized oligomer 1 was changed to a polyethylene oxide oligomer (=PEO oligomer, number of EO units: 50) in the compound 1 for forming an electro-conductive elastic layer. An electro-conductive member C-3 for electrophotography was produced in the same manner as in Example 1 except that the compound C-3 for forming an electro-conductive elastic layer was used.

It was suggested that the XNBR and the PEO oligomer were not bonded to each other in Comparative Example 3 because the microrubber hardness was low. In addition, the ratio at which the PEO oligomer of the electro-conductive elastic layer of Comparative Example 3 was extracted was 100% and hence it was revealed that the XNBR and the PEO oligomer were not bonded to each other. In Comparative Example 3, the PEO migrated and gathered, and hence the resistance was high and the outer diameter expansion was not suppressed. The rank concerning horizontal belt-like image unevenness resulting from a difference in outer diameter expansion was D and the rank concerning horizontal streak-like image unevenness resulting from a high resistance was C.

Comparative Example 4

An electro-conductive member C-4 for electrophotography of Comparative Example 4 was produced with the same materials as those of Example 1 by the same production method as that of Example 1 except that materials shown in the right column of Table 8 below were used instead of materials shown in the left column of Table 8.

In Comparative Example 4, the EO-PO-AGE-copolymerized polymer formed a domain phase, in which AO molecular chains gathered, to exist discontinuously, and hence the resistance was high and the outer diameter expansion was not suppressed. Both the ranks concerning horizontal belt-like image unevenness resulting from a difference in outer diameter expansion and horizontal streak-like image unevenness resulting from a high resistance were C.

TABLE 8

| Example 1 | Comparative Example 4 |
|-----------|----------------------|
| XNBR | NBR (trade name: "Nipol DN2850", manufactured by ZEON CORPORATION, acrylonitrile unit amount: 28%, Mooney viscosity: 50 ML1 + 4 (100° C.)) |
| One-terminal-epoxidized, EO-polymerized oligomer 1 | EO-PO-AGE-copolymerized polymer (trade name: "ZEOSPAN 8030", manufactured by ZEON CORPORATION) |

Comparative Example 5

A compound C-5 for forming an electro-conductive elastic layer was prepared in the same manner as in the compound 1 for forming an electro-conductive elastic layer except that the one-terminal-epoxidized, EO-polymerized oligomer 1 was not used in the compound 1 for forming an electro-conductive elastic layer. An electro-conductive member C-5 for electrophotography was produced in the same manner as in Example 1 except that the compound C-5 for forming an electro-conductive elastic layer was used.

As the electro-conductive elastic layer C-5 was free of any NBR having a unit represented by the formula (1), its resistance was high, though its outer diameter expansion coefficient was small. The rank concerning horizontal belt-like image unevenness resulting from a difference in outer diameter expansion was A, and the rank concerning horizontal streak-like image unevenness resulting from a high resistance was D.

Table 9-1 summarizes the materials of Examples 1 to 7, and Table 9-2 shows the results of the evaluations of the electro-conductive members according to the respective examples. In addition, Table 10-1 summarizes the materials of Comparative Examples 1 to 4, and Table 10-2 summarizes the results of the evaluations of the electro-conductive members according to the respective comparative examples. Further, Table 11 shows the structure of the unit to which the AO oligomer represented by the formula (1) is grafted of each of Examples 1 to 7, and Comparative Examples 1 and 2.

TABLE 9-1

| Material | | Example | | | | | | |
|---|---|---|---|---|---|---|---|---|
| | | 1 | 2 | 3 | 4 | 5 | 6 | 7 |
| XNBR | | 100 | 100 | 100 | 100 | 100 | 100 | 100 |
| NBR | | — | — | — | — | — | — | — |
| One-terminal-epoxidized, EO-polymerized oligomer 1 | (Number of AO units) m = 15 | 50 | — | — | — | — | — | — |
| One-terminal-epoxidized, EO-polymerized oligomer 2 | m = 10 | — | 50 | — | — | — | 70 | — |
| One-terminal-epoxidized, EO-polymerized oligomer 3 | m = 100 | — | — | 50 | — | — | — | 30 |
| One-terminal-epoxidized, PO-polymerized oligomer 1 | n = 15 | — | — | — | 50 | — | — | — |
| One-terminal-epoxidized, EO-PO-polymerized oligomer 1 | m = 10 + n = 10 | — | — | — | — | 50 | — | — |
| One-terminal-epoxidized, EO-polymerized oligomer 4 | m = 5 | — | — | — | — | — | — | — |
| One-terminal-epoxidized, EO-polymerized oligomer 5 | m = 200 | — | — | — | — | — | — | — |
| PEO oligomer | | — | — | — | — | — | — | — |
| EO-PO-AGE-copolymerized polymer | | — | — | — | — | — | — | — |

TABLE 9-2

| | Result of evaluation | | | | |
|---|---|---|---|---|---|
| Example | Volume resistivity ($\Omega \cdot cm$) | Outer diameter expansion coefficient (%) | Microrubber hardness (°) | Horizontal belt-like image unevenness due to abutting unevenness | Horizontal streak-like image unevenness |
| 1 | $1.7 \times 10^7$ | 2.5% | 48 | A | A |
| 2 | $2.6 \times 10^7$ | 2.2% | 47 | A | A |
| 3 | $3.4 \times 10^7$ | 3.9% | 50 | B | B |
| 4 | $1.9 \times 10^7$ | 2.4% | 47 | A | A |
| 5 | $1.0 \times 10^7$ | 2.7% | 49 | A | A |
| 6 | $1.6 \times 10^7$ | 3.2% | 45 | B | A |
| 7 | $4.1 \times 10^7$ | 2.3% | 53 | A | B |

TABLE 10-1

| Material | | Comparative Example | | | | |
|---|---|---|---|---|---|---|
| | | 1 | 2 | 3 | 4 | 5 |
| XNBR | | 100 | 100 | 100 | — | 100 |
| NBR | | — | — | — | 100 | — |
| One-terminal-epoxidized, EO-polymerized oligomer 1 | (Number of AO units) m = 15 | — | — | — | — | — |
| One-terminal-epoxidized, EO-polymerized oligomer 2 | m = 10 | — | — | — | — | — |
| One-terminal-epoxidized, EO-polymerized oligomer 3 | m = 100 | — | — | — | — | — |
| One-terminal-epoxidized, PO-polymerized oligomer 1 | n = 15 | — | — | — | — | — |
| One-terminal-epoxidized, EO-PO-polymerized oligomer 1 | m = 10 + n = 10 | — | — | — | — | — |

TABLE 10-1-continued

|  | Comparative Example | | | | |
|---|---|---|---|---|---|
| Material | 1 | 2 | 3 | 4 | 5 |
| One-terminal-epoxidized, EO-polymerized oligomer 4   m = 5 | 50 | — | — | — | — |
| One-terminal-epoxidized, EO-polymerized oligomer 5   m = 200 | — | 50 | — | — | — |
| PEO oligomer | — | — | 50 | — | — |
| EO-PO-AGE-copolymerized polymer | — | — | — | 50 | — |

TABLE 10-2

| | Result of evaluation | | | | |
|---|---|---|---|---|---|
| Comparative Exaple | Volume resistivity ($\Omega \cdot cm$) | Outer diameter expansion coefficient (%) | Microrubber hardness (°) | Horizontal belt-like image unevenness due to abutting unevenness | Horizontal streak-like image unevenness |
| 1 | $5.7 \times 10^7$ | 3.1% | 43 | A | C |
| 2 | $6.2 \times 10^7$ | 6.3% | 52 | C | C |
| 3 | $6.4 \times 10^7$ | 7.1% | 33 | D | C |
| 4 | $7.1 \times 10^7$ | 6.6% | 59 | C | C |
| 5 | $5.6 \times 10^9$ | 0.4% | 55 | A | D |

TABLE 11

| | Structure of unit to which AO oligomer is grafted |
|---|---|
| Example 1 | —CH$_2$CH— <br>       \| <br>       C=O <br>       \| <br>       O <br>       \| <br> HOCH$_2$CHCH$_2$—(OC$_2$H$_4$)$_{13}$—C$_{12}$H$_{25}$ |
| Examples 2, 6 | —CH$_2$CH— <br>       \| <br>       C=O <br>       \| <br>       O <br>       \| <br> HOCH$_2$CHCH$_2$—(OC$_2$H$_4$)$_{10}$—C$_{12}$H$_{25}$ |
| Examples 3, 7 | —CH$_2$CH— <br>       \| <br>       C=O <br>       \| <br>       O <br>       \| <br> HOCH$_2$CHCH$_2$—(OC$_2$H$_4$)$_{100}$—C$_{12}$H$_{25}$ |
| Example 4 | —CH$_2$CH— <br>       \| <br>       C=O <br>       \| <br>       O <br>       \| <br> HOCH$_2$CHCH$_2$—(OC$_3$H$_6$)$_{15}$—C$_{12}$H$_{25}$ |
| Example 5 | —CH$_2$CH— <br>       \| <br>       C=O <br>       \| <br>       O <br>       \| <br> HOCH$_2$CHCH$_2$—(OC$_2$H$_4$)$_{10}$—(OC$_3$H$_6$)$_{10}$—C$_{12}$H$_{25}$ |
| Comparative Example 1 | —CH$_2$CH— <br>       \| <br>       C=O <br>       \| <br>       O <br>       \| <br> HOCH$_2$CHCH$_2$—(OC$_2$H$_4$)$_5$—C$_{12}$H$_{25}$ |
| Comparative Example 2 | —CH$_2$CH— <br>       \| <br>       C=O <br>       \| <br>       O <br>       \| <br> HOCH$_2$CHCH$_2$—(OC$_2$H$_4$)$_{200}$—C$_{12}$H$_{25}$ |

As described above, an electro-conductive member for electrophotography formed of an electro-conductive elastic layer containing a crosslinked product of an NBR having a unit represented by the formula (1) obtained high electro-conductivity. In addition, a change in its shape due to water absorption was suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2011-084043 filed on Apr. 5, 2011, and includes the content thereof by reference as a part of this application.

What is claimed is:
1. An electro-conductive member for electrophotography, comprising:
an electro-conductive substrate; and
an electro-conductive elastic layer, wherein the electro-conductive elastic layer comprises a crosslinked product of an acrylonitrile-butadiene rubber having a unit represented by the following formula (1):

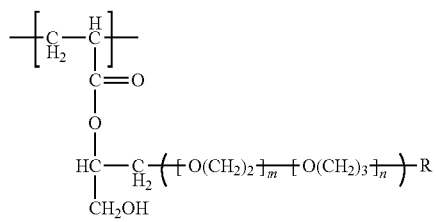

Formula (1)

in the formula (1), R represents a hydrogen atom or a hydrocarbon group having 1 to 20 carbon atoms, and m and n each independently represent an integer of 0 or 1 or more, provided that n+m is 10 or more and 100 or less.

2. The electro-conductive member according to claim 1, wherein said crosslinked product of an acrylonitrile-butadiene rubber has units represented by the following formulae (2) and (3):

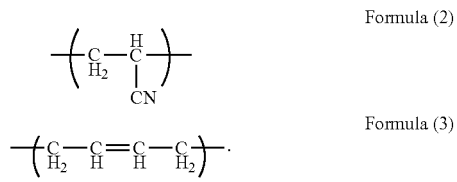

Formula (2)

Formula (3)

3. A process cartridge, comprising the electro-conductive member according to claim 1 as a charging member, wherein the process cartridge is detachably mountable to a main body of an electrophotographic apparatus.

4. An electrophotographic apparatus, comprising the electro-conductive member according to claim 1 as a charging member.

* * * * *